UNITED STATES PATENT OFFICE.

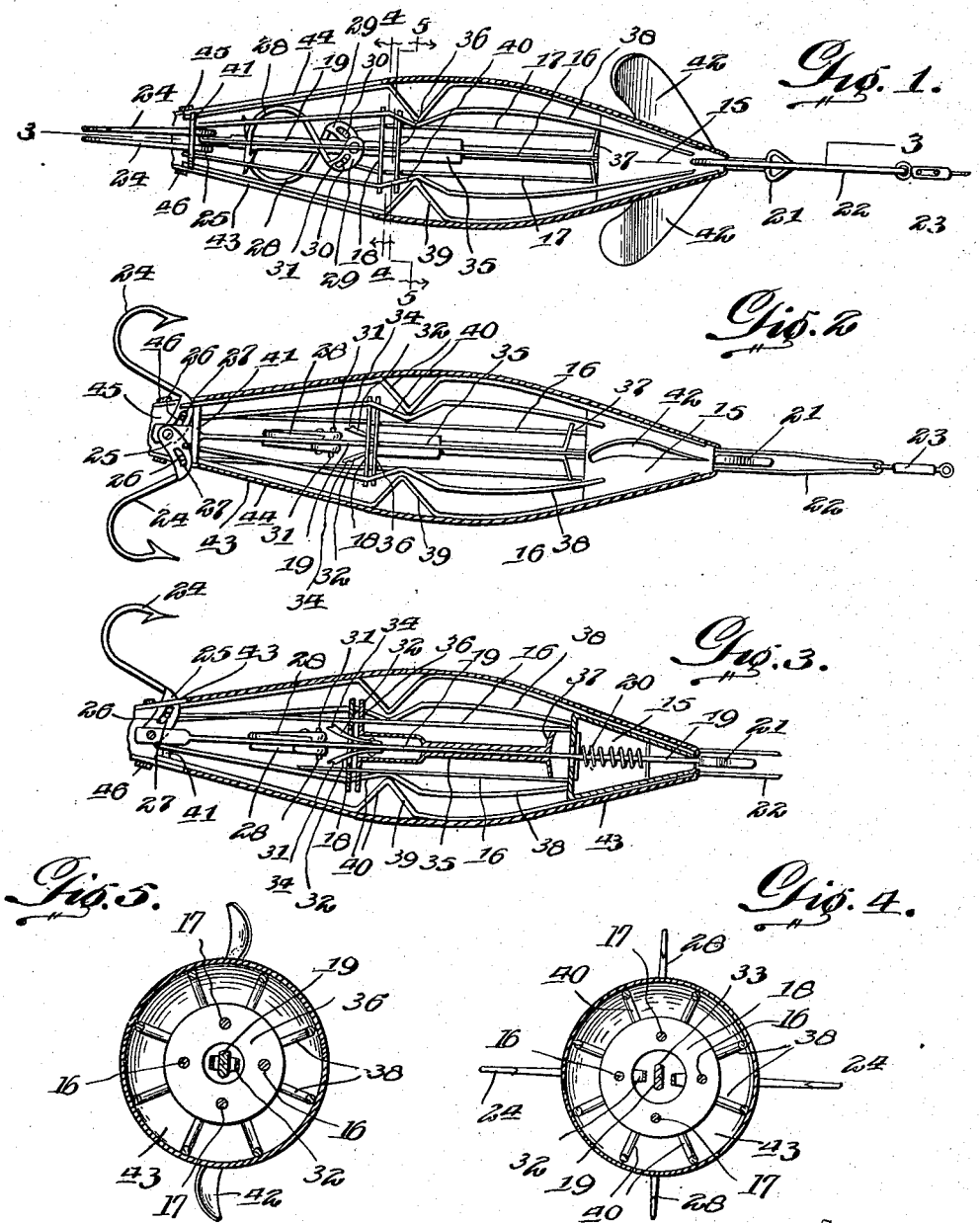

AUGUST BERGLUND, OF SAGINAW, MINNESOTA, ASSIGNOR OF ONE-HALF TO ANDREW GODENIUS, OF SAGINAW, MINNESOTA.

TRAP-HOOK.

1,217,690.  Specification of Letters Patent.  Patented Feb. 27, 1917.

Application filed July 21, 1916. Serial No. 110,590.

*To all whom it may concern:*

Be it known that I, AUGUST BERGLUND, a citizen of the United States, residing at Saginaw, in the county of St. Louis and State of Minnesota, have invented new and useful Improvements in Trap-Hooks, of which the following is a specification.

This invention relates to fish hooks and particularly to that class of devices which are known as trap hooks. The object of the invention is to produce a simple and efficient trap hook of improved construction which may be very readily set and which will be automatically sprung when the victim closes its mouth on the bait.

A further object of the invention is to produce a simple and efficient trap hook having a coat or cover whereby it will be efficiently protected and safe-guarded against being sprung by weeds or other obstructions which may lie in the path thereof.

A further object of the invention is to simplify and improve the detailed construction and operation of the parts constituting the improved device.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a view in side elevation of the improved trap hook showing the same set, the near side of the coat or cover having been removed.

Fig. 2 is a view taken at right angles to Fig. 1 and showing the device sprung, the near side of the coat or cover having been removed.

Fig. 3 is a longitudinal sectional view taken on the line 3—3 in Fig. 1.

Fig. 4 is a transverse sectional view taken on the line 4—4 in Fig. 1.

Fig. 5 is a transverse sectional view taken on the line 5—5 in Fig. 1.

Corresponding parts in the several figures are denoted by like characters of reference.

The body of the improved device consists of a hollow conical member 15 from the base of which rods 16, 17 extend in an outward direction, said rods being equidistantly disposed and in substantially parallel relation to the axis of the cone 15. The rods 16 are diametrically opposed to each other, and said rods 16 are longer than the rods 17 which are likewise disposed in diametrically opposite relation. The rods 16, 17 extend through and are fixedly connected with a disk 18, which latter is positioned near the outer ends of the rods 17; and said disk being centrally apertured for the passage of a rod or bar 19 which is slidably guided longitudinally through the cone 15, said bar being normally actuated in an outward direction by a spring 20 disposed within the cone. A handle 21 formed on the bar 19 abuts on the apex of the cone, thus forming also a stop member whereby the outward movement of the spring actuated bar 19 is limited. The handle 21 is located within a bail 22 which is securely connected with the apex of the cone, and which carries a swivel member 23 to which the line may be attached.

Pivotally connected with the bar 19 adjacent to two opposite faces thereof are hooks 24 having shanks 25 provided with slots 26, said slots being engaged by fingers 27 formed at the outer ends of the relatively long rods 16. Pivotally connected with the two opposed faces of the bar 19 which are located intermediate the faces adjacent to which the hooks 24 are pivoted are similar hooks 28 having shanks 29 provided with slots 30 that are engaged by fingers 31 formed at the outer ends of the relatively short rods 17. The outer and inner hooks 24 and 28 are thus, it will be seen, arranged for swinging movement in planes substantially at right angles to each other. It will also be seen that the parts are so arranged and proportioned that when the spring actuated bar carrying the hooks is projected in an outward direction to what may be regarded as its normal position, the several hooks carried by the bar will by the action of the fingers carried by the rods 16, 17 and engaging the slots in the shanks of the respective hooks be swung to the position normally occupied when the trap is sprung.

Connected with and carried by the bar 19 are spring supported latch members 32 which, together with the bar 19, are guided through the central aperture 33 of the disk 18, said latch members being provided at their outer ends with shoulders or offsets 34 which, when the bar 19 is retracted against the tension of the spring, will engage the disk 18, thereby maintaining the bar 19 in retracted position and the several hooks in set position. For the purpose of springing the trap mechanism is provided as follows:

Slidably guided on the bar 19 between the disk 18 and the base of the cone 15 is a tubular sleeve 35, one end of which is enlarged to accommodate the latch members 32, said enlarged end carrying also a disk 36 having apertures engaging the rods 16, 17 on which said disk is guided. The inner end of the sleeve 35 is provided with stop members 37 which, by abutting on the base of the cone 15, serve to limit the inward movement of the sleeve. Connected with the conical member 15 and extending outwardly with respect to the base thereof are a plurality of longitudinal slightly arcuate rods 38 constituting a cage that surrounds the bar 19 and related parts including the disks 18 and 36. Each of the rods 38 is provided intermediate the ends thereof with a V-shaped angular indentation 39 having obliquely disposed limbs one of which, 40, is adapted for engagement with the disk 36 carried by the slidable sleeve 35. The outer extremities of the cage rods 38 are connected together by an elastic band 41.

Suitably connected with the cone 15, which latter has been shown as being provided with propeller blades 42 whereby the device will be rotated when drawn through the water, is a coat or cover 43 of flexible material, such as rubber cloth, said coat being suitably shaped to fit exteriorly of the cage, and said coat being provided with longitudinal slits 44 producing flaps 45 which are connected together by an elastic band 46, the slits being arranged in such a fashion that the operation of the hooks will not be obstructed. This coat or cover constitutes a protector which will enable the device to be drawn through the water without danger of being sprung by accidental contact with weeds or other obstructions.

In the operation of setting the improved trap hook, the device should first be held upright so as to enable the sleeve carrying the disk 36 to gravitate in the direction of the base of the cone 15. The bar 19 is now retracted against the tension of the spring by laying hold of the cone 15 with one hand and seizing the handle 21 with the fingers of the other hand until the spring supported latch members 32 will engage the disk 18, thereby retaining the bar 19 in retracted position and setting the trap. The disk 36 of the sleeve 35 is now located in the path of the inclined limbs 40 of the angular indentations 39 of the cage rods 38. When a bite is had the mouth of the victim in closing about the device will actuate one or more of the resilient cage rods 38, forcing the disk 36 and the sleeve 35 to be moved in an outward direction. The sleeve 35 by engagement with the latch members 32 will swing the latter in the direction of the rod 19, disengaging the shoulders 34 from the disk 18, thereby causing the bar 19 to be projected by its actuating spring 20, thereby throwing the barbed ends of the hooks outward and securing the victim. The hooks may be readily withdrawn from the mouth of the victim by pulling the bar 19 in an inward direction in the manner which is practised in setting the trap.

Having thus described the invention, what is claimed as new, is:—

1. In a trap hook, a hollow conical body member, a spring actuated bar slidably guided therethrough, hooks pivotally connected with the faces of the bar, said hooks having slotted shanks, rods projecting from the base of the conical member and having fingers engaging the slotted shanks of the hooks, a disk carried by said rods and having an aperture through which the spring actuated bar is guided, latch members carried by the bar and adapted for engagement with the disk, and means for actuating the latch members to release them from engagement with the disk.

2. In a trap hook, a hollow conical body member, a spring actuated bar slidably guided therethrough, hooks pivotally connected with the faces of the bar, said hooks having slotted shanks, rods projecting from the base of the conical member and having fingers engaging the slotted shanks of the hooks, a disk carried by said rods and having an aperture through which the spring actuated bar is guided, latch members carried by the bar and adapted for engagement with the disk, and means for actuating the latch members to release them from engagement with the disk, said means including a tubular sleeve slidably guided on the spring actuated bar, and means for actuating said sleeve to force the latch members in the direction of the bar.

3. In a trap hook, a hollow conical body member, a spring actuated bar slidably guided therethrough, hooks pivotally connected with the faces of the bar, said hooks having slotted shanks, rods projecting from the base of the conical member and having fingers engaging the slotted shanks of the hooks, a disk carried by said rods and having an aperture through which the spring actuated bar is guided, latch members carried by the bar and adapted for engagement with the disk, and means for actuating the latch members to release them from engagement with the disk, said means including a sleeve slidably guided on the spring actuated bar, a disk carried by said sleeve and guided on the rods having the hook actuating fingers, and a cage consisting of resilient rods connected with the conical member, said rods having angular indentations forming obliquely disposed limbs adapted to engage the disk carried by the slidable sleeve.

In testimony whereof I affix my signature.

AUGUST BERGLUND.